United States Patent [19]

McCombie

[11] Patent Number: 5,191,935
[45] Date of Patent: Mar. 9, 1993

[54] UNIVERSAL TABLE-TOP JIG FOR TABLE-MOUNTED POWER TOOLS

[76] Inventor: James N. McCombie, 5273 Gertrude Street, Port Alberni, British Columbia, V9Y 6L1, Canada

[21] Appl. No.: 851,474

[22] Filed: Mar. 13, 1992

[51] Int. Cl.⁵ .................. B27B 5/18; B27C 9/02; B27H 1/00
[52] U.S. Cl. .................... 144/286 R; 83/477.2; 83/574; 83/701; 144/1 R; 144/287; 269/296; 269/303
[58] Field of Search ............... 144/1 R, 286 R, 286 A, 144/287; 83/477.2, 477.3, 574, 701, 438; 269/296, 297, 298, 301, 303, 318

[56] References Cited

U.S. PATENT DOCUMENTS

| | | | |
|---|---|---|---|
| 2,796,092 | 8/1955 | Gresdel . | |
| 3,246,675 | 1/1963 | Sweetser . | |
| 3,342,226 | 9/1967 | Marcoux et al. | 144/286 R |
| 3,734,151 | 5/1973 | Skripsky | 144/286 R |
| 4,406,200 | 9/1983 | Kerr | 83/473 |
| 4,502,518 | 3/1985 | Lewin | 144/286 A |
| 4,527,605 | 7/1985 | Ede et al. | 144/286 R |
| 4,726,405 | 2/1988 | Bassett | 144/287 |
| 4,964,450 | 10/1990 | Hughes et al. | 144/287 |
| 5,024,257 | 6/1991 | Lloyd | 144/286 R |

Primary Examiner—W. Donald Bray
Attorney, Agent, or Firm—Barrigar & Oyen

[57] ABSTRACT

A table-top jig for a table-mounted power tool comprises an apertured platform, the aperture extending longitudinally along the platform to allow free passage of the power tool saw through platform as the platform is slid over the table-top. The table-top jig further comprises a rip-fence which extends transversely along one end of the apertured platform. The apertured platform is mounted to the table-top by guide rails attached to the platform so that the platform may slidably move over the table-top in a direction transverse to the rip-fence. Securing means, such as a clamp may be used to releasably secure the platform to the table-saw table-ttop.

17 Claims, 4 Drawing Sheets

UNIVERSAL TABLE-TOP JIG FOR TABLE-MOUNTED POWER TOOLS

FIELD OF THE INVENTION

This invention relates to table-saws and like power tools having a lip-type work piece-supporting table-top, and in particular, to table-saw table-top platforms for supporting and guiding large work pieces.

BACKGROUND OF THE INVENTION

Workmen such as carpenters and cabinet makers often find it convenient to use portable table-saws of the kind having a saw blade protruding upwardly through the table surface. One such table-saw is the Makita TM 8¼-inch portable table-saw, model Japan. This type of table-saw may be referred to as a "lip-type" table-saw. Lip-type table-saws have table-tops whose circumference is formed of a protruding cantilevered ledge. Lip-type table-saws are to be distinguished from other types of table-saws having table-tops whose circumference has bars or rails attached thereto for mounting slidingly positionable rip-fences and the like. Slidingly positionable rip fences for use on lip-type table-saws are generally mounted to the table-saw table-top so as to slide over the table-top guided by channels in the underside of the table-top.

The problem with using portable table-saws is that the table surface over which a work piece must be guided is not very large. Consequently, it is difficult and cumbersome to accurately cut large work pieces, such as sheets of plywood or Arborite TM. In particular it is difficult to make straight-edged cuts parallel to one edge of such work pieces.

Typically, in order to make such cuts, a rip-fence must be used. A rip-fence is a vertical guide mounted on the surface of the table. The rip-fence is aligned parallel to the saw's cutting plane. As described above, portable table-saws are often provided with rip-fences that may be mounted in some fashion to slide over the table-top. These rip-fences suffice for cutting smaller work pieces.

After-market add-on rip-fences for mounting directly to a table-saw table-top are also available. One such add-on rip-fence is disclosed by U.S. Pat. No. 2,796,092, which issued to Harold B. Gresdel on Jun. 18, 1957 for his invention entitled Table Saw Set Works. Gresdel teaches an adjustable rip-fence for mounting to a table-saw table-top. The rip-fence is mounted to a carriage which slides over a base. The base is bolted to the table-top. A spring provides a biasing force biasing the carriage against adjustable stops mounted on the base. As with other rip-fences which are mounted to the table-saw table-top, Gresdel's cannot be adjusted beyond the edge of the table-top in order to accommodate large work pieces. The Gresdel device would have to be unbolted from the table-top and re-bolted to a separate table-top extension in order to accommodate a large work piece.

Table-top extensions to which a rip-fence may be attached are often required in order to cut large work pieces, especially where the desired width of the piece to be cut from the work piece (that is, the distance between the rip-fence and the blade) is wider than the maximum adjustable displacement between the blade and a rip-fence mounted directly to the table-top.

One such extension to which a rip-fence may be attached is disclosed in U.S. Pat. No. 4,965,450 which issued Oct. 23, 1990 to James D. Hughes et al. for entitled Extension for Table Saw. Hughes et al. teaches add-on extensions for extending conventional guide rails, upon which may be mounted a slidingly positionable rip-fence. The rip-fence may be clamped into position on the guide rail extensions. An adapter is provided for fitting over the rip-fence so as to support the material to be cut on a flange projecting from the adapter. The Hughes et al. device is particularly adapted for retro-fitting to saws of the type mentioned above having bars, rails or the like mounted to the circumference of the table-saw table-top. One such saw is manufactured by Delta International Machinery Corporation of Pittsburg, Pa., U.S.A. Hughes et al. does not teach supporting large work pieces irrespective of the position of the rip fence relative to the saw blade.

Another such table-top extension device is the Table Extension For Table Saws disclosed in U.S. Pat. No. 4,406,200, which issued Sep. 27, 1983 to William S. Kerr. Kerr provides table extensions which extend both parallel to, and perpendicular to, the plane containing the saw blade. The table extension extending parallel to the saw blade is supported by a brace. The brace bears against a vertical rigid surface mounted to the table-saw stand. Rollers are mounted on the end of the brace to bear against the vertical rigid surface so that the table surface, including the table extension, may be rotated relative to the horizontal. The table extension has a pair of parallel grooves in its surface. The grooves correspond to grooves in the table-saw table-top surface that run parallel to the plane containing the saw blade. The grooves may be used to mount conventional miter gauge rods or like accessories to be used in conjunction with the saw.

The table extension may be releasably mated to the table-saw table-top by inserting a block or rail provided on the table extension into one of two channels mounted to opposed edges of the table-top. The channels extend from the edges of the table-top, perpendicular to the saw blade. They may be joined by a crosspiece. The cross piece serves as the table extension perpendicular to the saw blade. The cross piece is supported by an adjustable leg. No provision is made for attaching a rip-fence to the cross piece so as to facilitate accurately cutting wide pieces from a large work piece. Additionally, if a rip-fence were to be attached to the cross-piece, a large supporting surface to support sheets of plywood and the like would not be provided when the rip-fence was used to cut narrow strips from the plywood.

Another table-top extension device is taught by U.S. Pat. No. 4,726,405, which issued on Feb. 23, 1988 for the invention of Alvin L. Bassett entitled Extension Table Assembly For Table Saws. The Bassett patent discloses a table extension supported on a wheeled cart for fastening to a table-saw. The table extension has a fixed array of pivotally mounted rip-fences, the rip-fences disposed laterally across the table extension. The rip-fences may be individually pivoted from a position flush with the table extension surface to a vertical position at right angles to the table extension surface. No provision is made for slidable adjustment of the position of the rip-fences relative to the saw blade or for supporting a large work piece irrespective of which rip fence is used on the table extension.

The present invention is a simple unitary platform structure adapted for use with lip-type saws to facilitate supporting a large work piece, such as a sheet of plywood or Arborite TM, no matter where the rip-fence on the structure is positioned in relation to the table-saw blade. Quick adjustment of the position of the rip-fence is facilitated without loss of accuracy in cuts made using the rip-fence.

SUMMARY OF THE INVENTION

The invention provides a table-saw table-top jig adapted to be used on a lip-type portable table-saw for supporting and guiding large work pieces onto the table-saw blade. The jig is slidably mounted on the table-saw table-top. Guide means on the underside of the jig restrict sliding movement of the jig, relative to the table-top, to a direction perpendicular to the plane containing the table-saw blade. A vertically disposed rip-fence is mounted on one end of the jig, parallel to the saw blade. The jig may be held rigidly in place relative to the table-top by clamping the jig to the table-top.

The table-top jig comprises an apertured platform, the aperture extending longitudinally along the platform to allow free passage of the saw through the platform as the platform is slid over the table-saw table-top. They table-top jig further comprises a rip-fence which extends transversely along one end of the platform. The platform is mounted by mounting means to the table-saw table-top so that the platform may slidably move over the table-top in a direction transverse to the rip-fence. Securing means, such as a clamp may be used to releasably secure the platform to the table-saw table-top.

Advantageously, at least one insert is provided for removable mating with the aperture in the platform. When mated, the top surface of each insert is co-planar with the apertured platform surface.

In one embodiment, the guide means and mounting means comprise parallel guide members, which may be an opposed pair of parallel guide rails, which are spaced apart and have opposed longitudinal channels therein for snugly and slidingly receiving opposed edges of the table-saw table-top when the platform is mounted for slidable movement over the table-top.

The table-top jig may alternatively be described as having a first planar member, the first planar member having parallel guide rails for guiding the first planar member over the table-saw table-top in a direction perpendicular to the plane containing the saw blade. The rip-fence mounted on the platform may be then described as a second member mounted upon and transversely across the first planar member. Because the table-top jig may be equally well adapted for use on table-mounted power tools other than table-mounted circular saws (that is, table-saws), the present invention may also be described as a table-top jig for table-mounted power tools.

BRIEF DESCRIPTION OF THE DRAWINGS

In drawings which illustrate an embodiment of the invention.

DETAILED DESCRIPTION OF A PREFERRED EMBODIMENT

Figure 1:
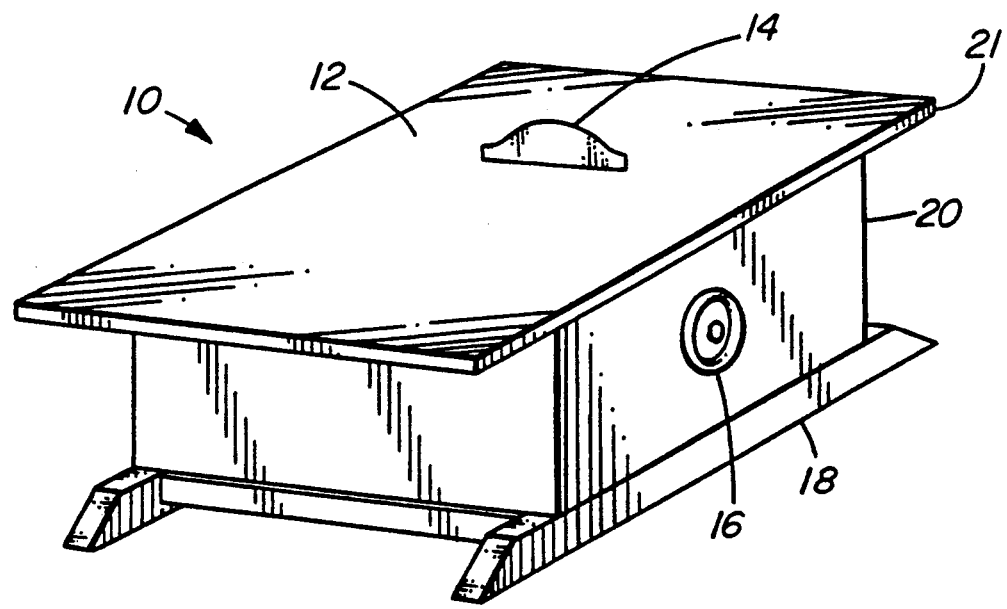
FIG. 1 is a prior art portable table-saw.

Illustrated in FIG. 1 is a prior art portable table-saw. Table-saw 10 has a table-top 12 for supporting work pieces (not shown) such as sheets of plywood or Arborite TM. A work piece is cut by sliding the work piece over table-top 12 so that saw blade 14 cuts the work piece as the work piece is fed into the saw blade. Saw blade 14 protrudes upwardly from table-top 12 and may be raised or lowered by turning knob 16 to adjust the depth of cut. Portable table-saw 10 may be mounted upon stand 18. Stand 18 may be of low elevation to facilitate the manipulation of large work pieces onto table-top 12 by a single workman. Table-top 12 is flat and is typically rectangular in plan view. It extends outwardly beyond the circumference of base 20. Table-top 12 has a down-turned lip 21 around its circumference (see also FIG. 4).

The low elevation of stand 18 (here illustrated constructed from 2"×4" studs) enhances the safe use of table-saw 10. Whereas conventional table-saw stands elevate the table-saw table-top to approximately waist height, when table-saw 10 is mounted on stand 18, table-top 12 is elevated to only approximately knee-height (16 inches). Consequently, the workman can maintain a better overview of the workpiece as it is fed into saw blade 14, and in particular, can maintain a better view of the placement of his hands in relation to saw blade 14. This is especially important when cutting flexible work pieces such as sheets of Arborite TM, as it is usually necessary in those instances for the workman to stabilize the sheet in close proximity to the saw blade. Further, a large sheet work piece may be balanced on the table-top and the power switch may still be reached so that power may be applied after the work piece has been positioned. Conventional table-saws require that power be applied to the saw before the work piece be placed onto the table-top because the height of the table-top means the power switch cannot usually be reached while the workman is supporting the work piece (unless a foot switch is being used).

Figure 2:
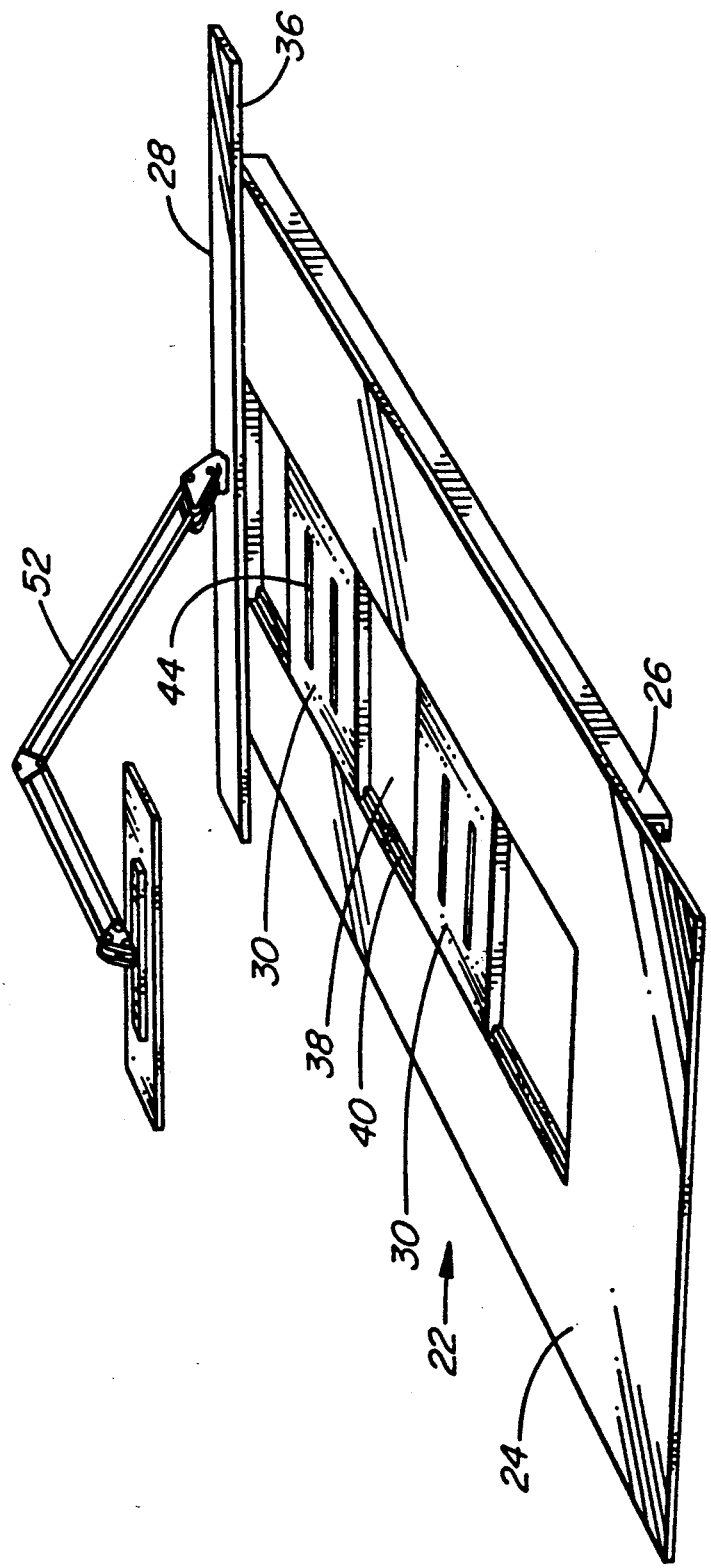
FIG. 2 is a perspective view of a table-saw table-top jig constructed in accordance with the present invention.

As illustrated in FIG. 2, the universal table-top jig 22 of the present invention incorporates platform 24, guide rails 26, rip-fence 28 and inserts 30. Platform 24 is mounted onto table-top 12 by sliding guide rails 26 over the edges of table-top 12. Guide rails 26 are parallel and spaced apart so that table-top 12 fits snugly between vertical rail elements 32 (see FIGS. 3 and 4). Vertical movement of platform 22 relative to table-top 12 is restricted by flanges 34 on guide rails 26. Flanges 34 snugly constrain platform 24 against the underside of lip 21 of table-top 12. Guide rails 26 are aligned perpendicular to rip-fence 28 and are affixed to the underside of platform 24 by suitable fastening means such as a combination of glue and screws (not shown). In order to ensure a snug fit of guide rails 26 over table-top 12, guide rails 26 are individually sized for each different make and model of table-saw. Consequently, by proper placement and sizing of guide rails 26, universal table-top jig 22 may be constructed to fit onto any type of lip-type table-saw, or onto any other type of table-saw or onto table-mounted routers or the like.

Platform 24 may be manufactured from ⅝ inch plywood if saw blade 14 has a 10 inch or greater diameter. If saw blade 14 has a diameter of less than 10", for example if saw blade 14 is a standard 8¼ inch diameter blade, then thinner plywood, preferably ½ inch plywood, should be used to construct platform 24. This will ensure that a minimum of preferably 1¾ of saw blade elevation will extend above platform 24. A laminate top sheet, such as Arborite ™, may be glued to the upper surface of platform 24 to facilitate smooth transport of a work piece over the platform. It has been found that for optimum ease of use the all surfaces should be occasionally coated with spray silicone. Typical dimensions for platform 24 are 5' in length by 27" in width. It has been found advantageous to have platform 24 extend longitudinally beyond the ends of guide rails 26. This arrangement facilitates mounting platform 24 onto table-top 12. The workman merely drops the platform extension onto table-top 12 so that the weight of the platform is supported at one end by the table-saw. The workman may then slide the platform transversely until guide rails 26 are aligned with the corresponding edges of lip 21. Once the guide rails are aligned, the platform is mounted onto table-top 12 by sliding the guide rails longitudinally so as to slidingly engage the edges of the table-top.

Rip-fence 28 is mounted transversely upon one end of the top surface of platform 24, with guide surface 36 aligned parallel to saw blade 14. As shown best in FIGS. 3 and 6, guide surface 36 is the edge of rip-fence 28 which is closest to saw blade 14. Guide surface 36 is used to maintain one edge of a work piece parallel to saw blade 14 as the work piece is being slidably advanced over platform 24 through saw blade 14. As illustrated, rip-fence 28 may extend laterally beyond the edges of platform 24 to assist in guiding large workpieces over saw blade 14. Rip-fence 28 may be constructed of a 1"×4" board and may be mounted to platform 24 by suitable fastening means such as glue or screws (again not shown). It has been found convenient to make rip-fence 28 three feet in length, extending approximately 4½" beyond either side of platform 24.

Platform 24 has a rectangular, longitudinal aperture 38 which extends parallel to guide rails 26. Aperture 38 is centered laterally on platform 24 and must be wider than the diameter of saw blade 14 so that saw blade 14 may be elevated through aperture 38 above the top surface of platform 24. One edge of aperture 38 lies immediately beneath guide surface 36 and extends parallel thereto. Aperture 38 extends from guide surface 36 along substantially the length of platform 24. Typically, aperture 38 extends 49" longitudinally from guide surface 36 and is wide enough to allow a 1 inch clearance between platform 24 and the cutting edges of saw blade 14 when blade 14 is at its maximum elevation above platform 24 (a clearance of at least ⅜" is recommended).

Figure 5:
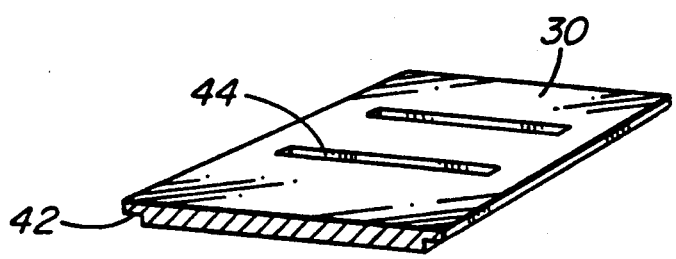
FIG. 5 is a perspective view of a platform insert.

The longitudinal edges of aperture 38 are rabbeted with rabbets 40. As illustrated in FIG. 5, inserts 30 have corresponding rabbets 42 so that inserts 30 may be mated with aperture 38 with the result that the top surfaces of inserts 30 will be co-planar with the top surface of platform 24. Inserts 30 thus assist in sliding work pieces over platform 24 by reducing the likelihood that a corner or edge of a work piece will become caught in aperture 38. Rabbets 40 and 42 are typically ¼"×¼" in cross-sectional dimension.

Inserts 30 have slots 44 cut therethrough. Slots 44 are aligned parallel to saw blade 14 when inserts 30 are mated with aperture 38. Slots 44 are sufficiently large to receive saw blade 14, so that any slot in any insert accommodates the full height elevation of blade 14 when aligned over blade 14.

Slots 44 may be cut in the following manner: An uncut insert 30 is placed in aperture 38 with blade 14 in the lowered position and with the saw turned off. Slots 44 may be cut into inserts 30 by raising the blade 14, while the saw is on and the blade turning, up through the uncut insert 30. The resulting slot 44 is thus the width of the blade 14. It has been found that having blade 14 fit snugly in slot 44 prevents tearing of the underside of a work piece as the work piece is being cut.

Figure 3:
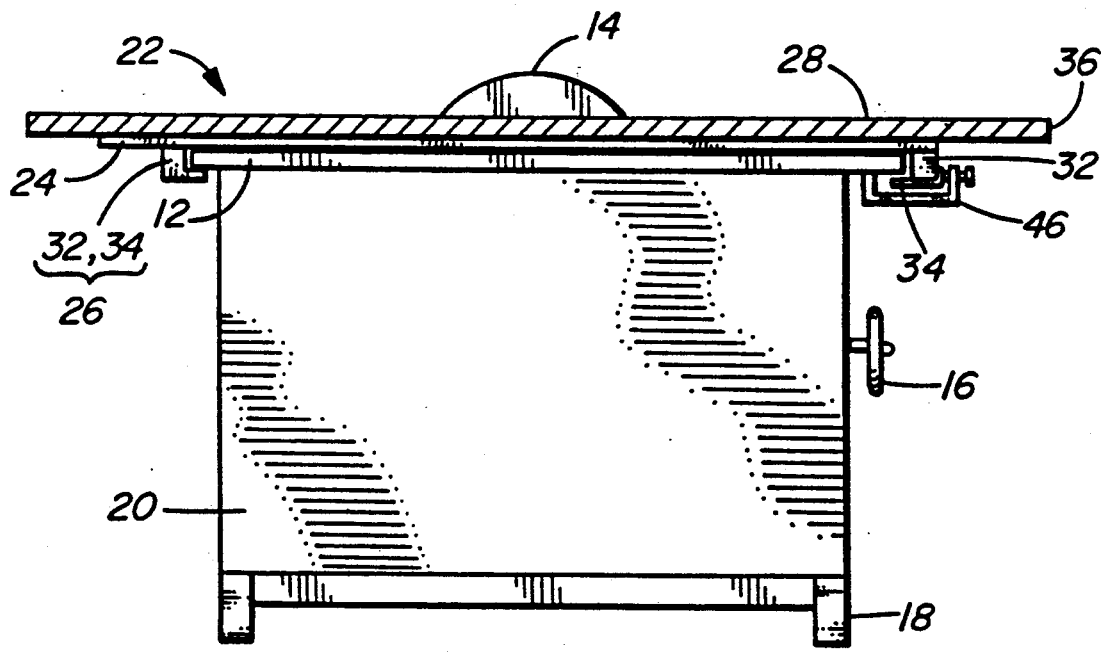
FIG. 3 is a front elevation view showing the table-top jig of FIG. 2 mounted onto the prior art portable table-saw of FIG. 1.
Figure 4:
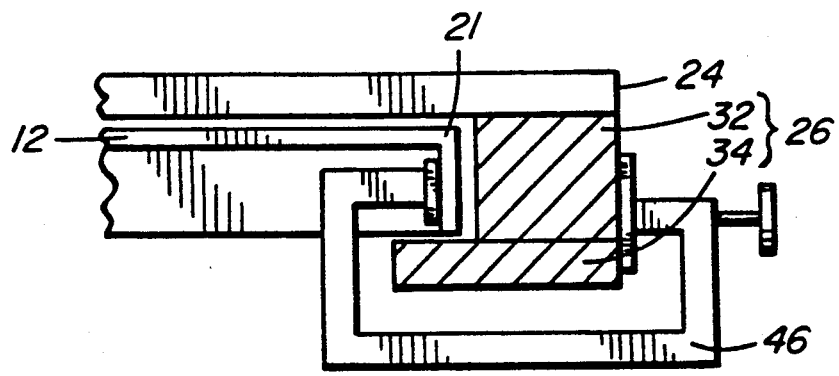
FIG. 4 is a cross-section cut-away view along lines 4—4 in FIG. 6.
Figure 6:
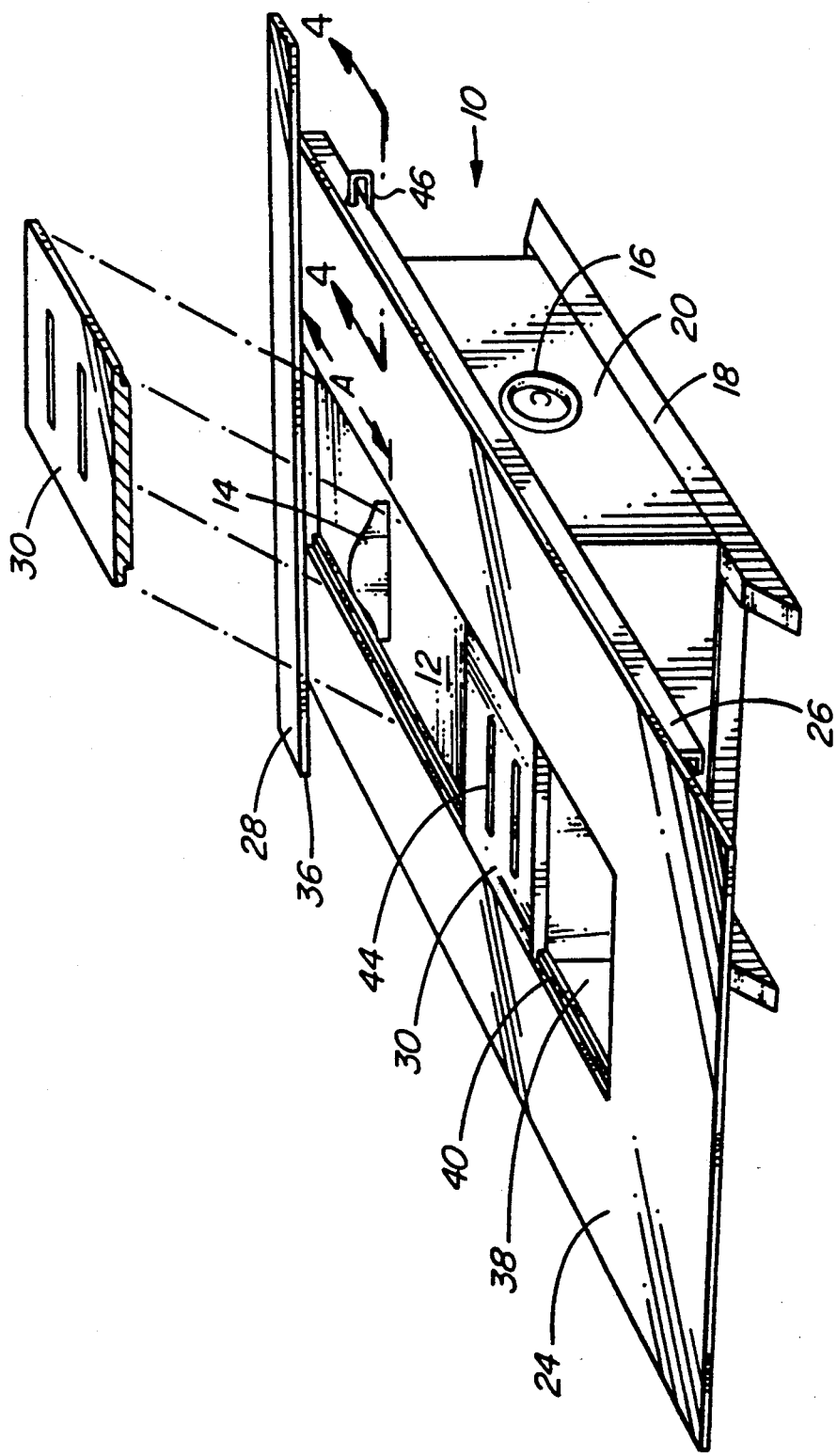
FIG. 6 is a partially exploded perspective view of the table-top jig of FIG. 2 mounted on the prior art portable table-saw of FIG. 1.

As illustrated in FIGS. 3, 4 and 6, clamp 46 may be used to clamp jig 22 to table-top 12 so as to prevent relative movement between rip-fence 28 and saw blade 14. Clamp 46 is placed to bear against the outside of guide rail 26 and the inside of lip 21. It has been found that one clamp, when tightened, is usually sufficient to prevent sliding movement of platform 24 over table-top 12. Guide rails 26 must, however, be fit snugly over lip 21 and table-top 12.

To make a cut parallel to one edge of a work piece, the width of the segment to be cut from the work piece is measured and a corresponding adjustment is made to the position of jig 22 on table-top 12. More particularly, jig 22 is adjusted by fastening clamp 46 and sliding platform 24 over table-top 12 until rip-fence 28 is at the desired distance away from saw blade 14. The work piece may then be cut by sliding it over platform 24, into saw blade 14, while maintaining one edge of the work piece aligned against guide surface 36 of rip-fence 28.

For example, in order to cut a 2 foot wide strip from a sheet of plywood, platform 24 is slid over table-top 12 until the distance between saw blade 14 and rip-fence 28 (distance "A" in FIG. 6) is the desired 2 foot separation. Platform 24 is then clamped rigidly into place relative to table-top 12 by securing clamp 46 to hold rip-fence 28 in position relative to saw blade 14. Inserts 30 are placed into aperture 38. The plywood sheet is then advanced over platform 24 with one edge of the sheet being held against guide surface 36, thereby cutting the desired 2 foot wide strip from the work piece.

To reset platform 24 to cut a strip of a different width, inserts 30 are removed for later repositioning, clamp 46 is released, and platform 24 is slid over table-top 12 until distance "A" corresponds to the next desired strip width. No further measurements are required. The snug fit of guide rails 26 over table-top 12 ensure that rip-fence 28 remains parallel to saw blade 14.

The method to be used when cutting large work pieces using the present invention differs slightly depending on the nature of the work piece. For example, experience has shown that when cutting large laminate work pieces (that is, sheets of thin flexible material, such as Arborite ™), the work piece may be pulled in one continuous operation over platform 24 and saw blade 14, entirely from the out-feed side. It is sometimes necessary to pull such work pieces because large thin work pieces wobble and are otherwise difficult to control if an attempt is made to push them over the platform. Of course, when pulling the work piece entirely from the out-feed side, great care must be taken to keep workman's hands, clothing, etc. from contacting the saw blade.

Figure 7:
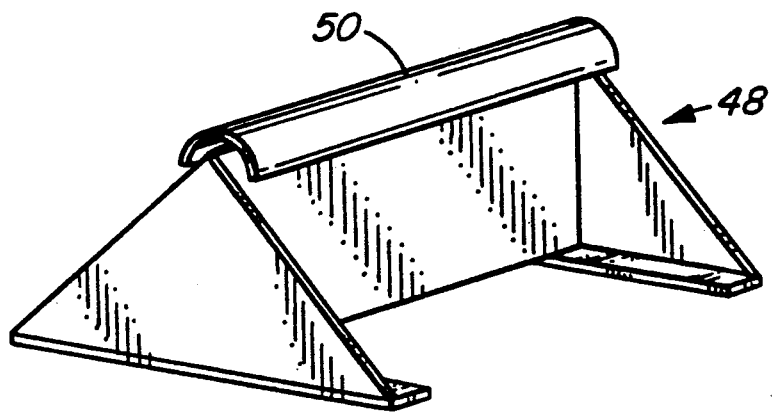
FIG. 7 is a perspective view of an outrigger for use in conjunction with the table-top jig and table-saw arrangement of FIG. 6.

When cutting thicker sheets of material (that is, material other than large laminate work pieces), the workman should push the work piece over platform 24 and saw blade 14 from the in-feed side until the work piece is balanced on platform 24, at which point the work piece can be pulled from the out-feed side in order to finish the cut. As the work piece is pulled from the out-feed side, it is advantageous to have an outrigger 48 (see FIG. 7) positioned between the workman and platform 24 to support the work piece on support surface 50 as it is pulled from platform 24. Support surface 50 may merely be a segment of PVC pipe (the pipe cut in half lengthwise) mounted on any suitable support frame).

Outrigger 48 also facilitates the cutting of large work pieces by a lone workman. Work piece support surface 50 is of approximately the same elevation as the top surface of platform 24. Outrigger 48 is typically placed beside platform 24 on the side where the cut work piece will exit from table-top 12 (the "out-feed"). Outrigger 48 is placed to support the work piece as it is either pushed or pulled from table-top 12. Once the work piece has been pushed or pulled at least partially from table-top 12 so as to overlay support surface 50, outrigger 48 may be used as a fulcrum so that the weight of the work piece extending in the out-feed direction beyond outrigger 48 will over-balance about the fulcrum. This will cause the portion of the work piece nearest saw blade 14 to be urged up and away from saw blade 14. This will also urge the workman's hands up and away from saw blade 14 if the work piece is being pushed from the in-feed.

When the platform is positioned at either of the two maximum extension positions (that is, when distance "A" is either a minimum or a maximum), a temporary support leg to support the free end of the platform may be required if the work piece is particularly large and heavy, for example, a 4"×8" sheet of medium or high density particle board such as Ranger Board TM or Medite TM. A 2"×2" leg member has been used successfully. However, I have found that generally a support leg is not required. Alternatively, an outrigger such as outrigger 48 may be used for support.

Other optional features may include a remote ON/OFF foot switch for cutting off the power supply to the table-saw without requiring that one of the workman's hands let go of the work piece. Further, as illustrated in FIG. 2, a detachable saw blade guard 52 may be used. The saw blade guard may be made from a desk lamp of the swivel adjustable type by substituting a piece of flat or hood-like plexiglass for the head of the lamp.

As will be apparent to those skilled in the art in the light of the foregoing disclosure, many alterations and modifications are possible in the practice of this invention without departing from the spirit or scope thereof. For example, the universal table-top jig may be adapted for mounting onto table-saws other than lip-type table-saws or for mounting onto table-mounted routers or like power tools which have a cutting blade protruding upwards from a work piece-supporting table surface. Accordingly, the scope of the invention is to be construed in accordance with the substance defined by the following claims.

What is claimed is:

1. A table-top jig for a power tool mounted to a table-top, said jig comprising:
   (a) an apertured platform;
   (b) a rip-fence extending transversely along one end of said apertured platform;
   (c) mounting means for mounting said apertured platform for slidable movement over said table-top in a direction transverse to said rip-fence to position said apertured platform at a selected location; and,
   (d) securing means for releasably securing said platform to said table-top at said selected location.

2. The table-top jig of claim 1 wherein said apertured platform is larger than said table-top.

3. The table-top jig of claim 2, wherein said platform aperture extends longitudinally along said apertured platform to allow free passage of said power tool through said apertured platform as said apertured platform is slidably moved over said table-top.

4. The table-top jig of claim 3 wherein said apertured platform further comprises an insert for removable mating with said aperture.

5. The table-top jig of claim 4 wherein said insert is co-planar with said apertured platform when said insert is mounted in said aperture.

6. The table-top jig of claim 1 wherein said securing means comprises a clamp for releasably attaching said apertured platform to said table-top.

7. The table-top jig of claim 1 wherein said mounting means comprises parallel guide members depending from and rigidly mounted to the underside of said apertured platform and extending perpendicular to said rip-fence.

8. The table-top jig of claim 7 wherein said parallel guide members comprise an opposed parallel pair of guide rails, said guide rails spaced apart and having opposed longitudinal channels therein for snugly, slidingly receiving opposed edges of said table-top when said apertured platform is mounted for slidable movement over said table-top.

9. A table-top jig for a power tool mounted to a table-top, said jig comprising:
   (a) a first planar member having a planar surface at least as large as the surface of said table-top;
   (b) means for snug, slidable mating of said first member over said table-top;
   (c) a second member mounted upon and transversely across one end of said first member; and,
   (d) means for releasably securing said first member in fixed relation to said table-top,
wherein:
   (e) said means for snug, slidable mating of said first member over said table-top comprises parallel guide rails mounted to said first member for constraining said first member to said slidable mating over said table-top in a direction perpendicular to a plane containing a power tool blade protruding vertically through said table-top;
   (f) said first member has an aperture therein for free passage of said blade through said aperture as said first member is slidably moved over said table-top; and,
   (g) said means for releasably securing said first member is releasably securable to allow sliding movement of said first member to a selected position relative to said table-top.

10. The table-top jig of claim 9 wherein said aperture extends longitudinally along said first member.

11. The table-top jig of claim 10 wherein said apertured first member further comprises an insert for removable mating with said aperture.

12. The table-top jig of claim 11 wherein said insert is co-planar with said apertured first member when said insert is mounted in said aperture.

13. The table-top jig of claim 9 wherein said means for releasably securing said first member comprises a clamp.

14. The table-top jig of claim 9 wherein said parallel guide rails comprise an opposed pair of guide rails spaced apart and having opposed longitudinal channels therein for snugly, slidingly receiving opposed edges of said table-top when said first member is mounted for slidable movement over said table-top.

15. The table-top jig of claim 14 wherein said guide rails are mounted to the underside of said first member.

16. The table-top jig of claim 9 wherein said second member is a rip-fence which extends transversely from the edges of said first member.

17. A table-top jig for a power tool mounted to a table-top, said jig comprising:
(a) an apertured platform;
(b) a rip-fence extending transversely along one end of said apertured platform;
(c) mounting means for mounting said apertured platform for slidable movement over said table-top in a direction transverse to said rip-fence to position said apertured platform at a selected location; and,
(d) securing means for releasably securing said platform to said table-top at said selected location, wherein:
(e) said apertured platform is larger than said table-top;
(f) said platform aperture extends longitudinally along said apertured platform to allow free passage of said power tool through said apertured platform as said apertured platform is slidably moved over said table-top;
(g) said apertured platform further comprises an insert for removable mating with said aperture;
(h) said insert is co-planar with said apertured platform when said insert is mounted in said aperture;
(i) said securing means comprises a clamp for releasably attaching said apertured platform to said table-top;
(j) said mounting means comprises parallel guide members depending from and rigidly mounted to the underside of said apertured platform and extending perpendicular to said rip-fence; and
(k) said parallel guide members comprise an opposed parallel pair of guide rails, said guide rails spaced apart and having opposed longitudinal channels therein for snugly, slidingly receiving opposed edges of said table-top when said apertured platform is mounted for slidable movement over said table-top.

* * * * *